April 8, 1952  G. P. ECONOMAKIS  2,592,258
ARTICLE OF MANUFACTURE IN FORM OF A PICTURE
AND METHOD OF MAKING SAME
Filed April 19, 1950
Fig-1-
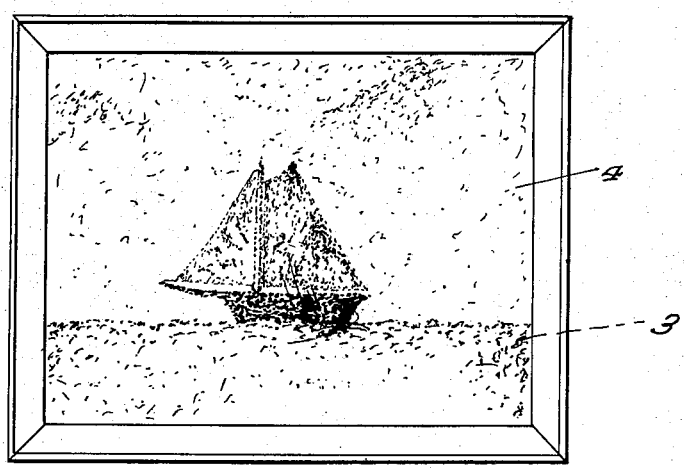
Fig-2-
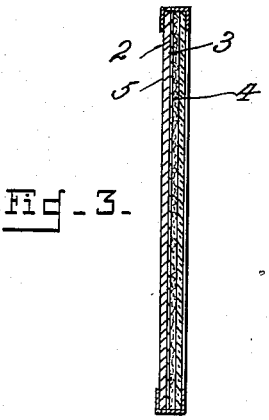
Fig-3-
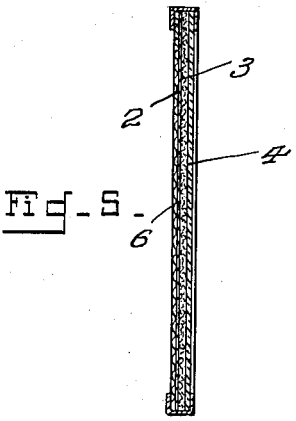
Fig-5-
Fig-4-
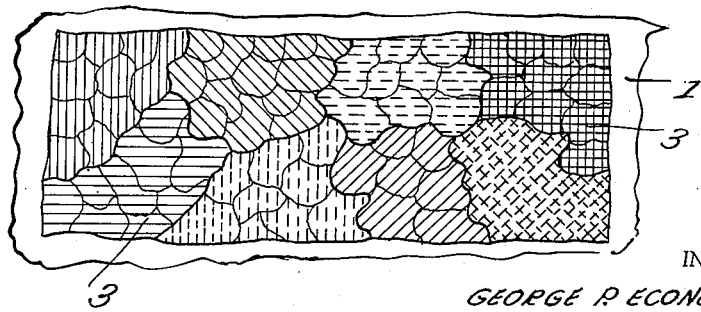
INVENTOR
GEORGE P. ECONOMAKIS
BY
ATTORNEY

Patented Apr. 8, 1952

2,592,258

UNITED STATES PATENT OFFICE 2,592,258

ARTICLE OF MANUFACTURE IN THE FORM OF A PICTURE AND METHOD OF MAKING SAME

George P. Economakis, Asbury Park, N. J.

Application April 19, 1950, Serial No. 156,882

1 Claim. (Cl. 41—22)

This invention relates to an article of manufacture in the form of a picture and the method of making same.

The primary object of the invention is to preferably utilize shaved pieces of flat colored to form a picture, in lieu of paint as now usually employed.

In making the picture, while I prefer using shaved flat pieces of colored glass, I may use glass ground in small pieces. In fact beads of various colors and sizes may be used to illustrate the desired picture, or I may use shaved colored pieces of glass mixed with other colored pieces of glass or the addition of colored beads. In other words my invention concerns broadly the use of pieces of colored glass in any form to produce the desired picture.

In the method of manufacturing the picture, it is important a base be provided, on which the pieces of glass are spread and arranged in picture form. This base may be in the form of a plain sheet of glass or other transparent material, or it may be in the form of metal, wood or canvas, depending on whether the picture is to be viewed from both sides, one side, or from a somewhat flexible piece of material hung on a wall.

Before the glass pieces are distributed in picture form on the plain base piece of material, a coating of glue may be applied so that the small pieces of glass will be temporarily located to preserve the arrangement of colors. Then a protective piece of glass is placed over the arrangement of small pieces of glass to hold them in the pre-arranged form. When the protective piece of glass is fixed in place, the assembly is placed in an oven to somewhat soften the small colored glass pieces so that they will adhere to the surfaces of the base and protective sheets of glass and thus form a substantially integral unitary structure.

In this connection, while it is preferable to use glue to preliminarily hold the small pieces of glass in place, it is not absolutely necessary.

When the glass is finally treated in the oven a picture is produced with all the desired colors without the use of paint, or other coloring matter save that which is employed in coloring the small particles of glass previous to their being used for picture purposes.

Other objects and advantages will be hereinafter described and particularly pointed out in the claim.

In the drawing,

Figure 1 is a face view of the improved picture in somewhat diagrammatic form.

Figure 2 is a sectional view of the picture showing the parts on an enlarged scale.

Figure 3 is a detail similar view showing the glass particles on a piece of metal.

Figure 4 is an enlarged detail diagrammatic view illustrating the colored glass pieces.

Figure 5 is a section showing the glass picture on a sheet of canvas.

In the accompanying drawing 1 represents a base piece of flat transparent glass. On one surface of this base piece of glass a coating of glue 2 can be applied, or if desired the glue can be omitted. Then small pieces of colored glass 3 are arranged in pre-determined picture form on the glued or plain surface, whichever is found desirable.

Shaved pieces or particles of glass are flat in form, and are preferred in making up the design on the base, although pieces of glass in this form are not absolutely necessary. For instance I may employ small pieces of colored glass formed other than by shaving. Or I may employ colored beads in lieu of pieces of irregular glass, it depending entirely on the nature of the design desired.

When the small pieces of shaved glass have been arranged on the base sheet of glass, a protective sheet of glass 4 is placed over the design formed by the small pieces of glass on the base sheet, and the assembled glass is placed in an oven and baked or heated to a point where the small particles are semi-softened to a degree to cause them to adhere to both the base and protective sheets of glass.

When the assembly is withdrawn from the oven, the whole structure is formed in a substantially integral mass.

I have described the base sheet as of glass; consequently when the article is finished and held up to the light the picture is visible from the front as well as from the back. However, when the particles of glass are arranged on a metal or wood base 5, shown in Figure 3, the picture only appears when viewed from the front.

If it be desired to produce a picture formed of colored glass particles as described, on canvas or the like flexible material 6 as shown in Figure 5, the same steps described are employed, except that the heating step is omitted. As a matter of fact when a picture is formed on a piece of canvas, the surface may or may not be covered with a transparent sheet.

From the foregoing description it is evident I have provided a new and unique picture and method of making the same, entirely formed of shaved or otherwise small pieces of colored glass, or a picture formed of colored glass between a pair of transparent sheets of glass or a picture formed of glass on a flexible base.

The invention is susceptible of many designs and uses in the making of pictures void of paint in depicting the features of the picture, save the coloring matter used in the glass.

What I claim is:

An article of manufacture comprising a base sheet of transparent glass, a colored picture formed on the base sheet of transparent glass, said picture being formed by assembled individual shaved pieces of previously-colored glass, a front sheet of transparent glass fitted over the picture formed by the assembled individual previously-colored shaved pieces of glass, the base sheet of transparent glass and the shaved pieces of previously-colored glass and the front sheet of transparent glass being fused together to a degree to avoid destruction of the shape and color of the shaved pieces of colored glass, whereby when the shaved pieces of glass and the two sheets of glass are united, a picture formed by the shaved pieces of glass is visible through both the front and base sheets of transparent glass.

GEORGE P. ECONOMAKIS.

REFERENCES CITED

The following references are of record in the file of this patent:

UNITED STATES PATENTS

| Number | Name | Date |
| --- | --- | --- |
| 494,063 | Grosse | Mar. 21, 1893 |
| 748,849 | Euncan | Jan. 5, 1904 |
| 817,963 | Devillers | Apr. 17, 1906 |
| 2,233,259 | Harth | Feb. 25, 1941 |
| 2,502,758 | Short | Apr. 4, 1950 |

FOREIGN PATENTS

| Number | Country | Date |
| --- | --- | --- |
| 26,547 of 1898 | Great Britain | Feb. 25, 1899 |